July 10, 1962     J. DE LA GARZA     3,043,554
NON-DRIP FAUCET VALVE

Filed June 26, 1961     2 Sheets-Sheet 1

INVENTOR.
J. de la Garza

July 10, 1962
J. DE LA GARZA
3,043,554
NON-DRIP FAUCET VALVE
Filed June 26, 1961
2 Sheets-Sheet 2
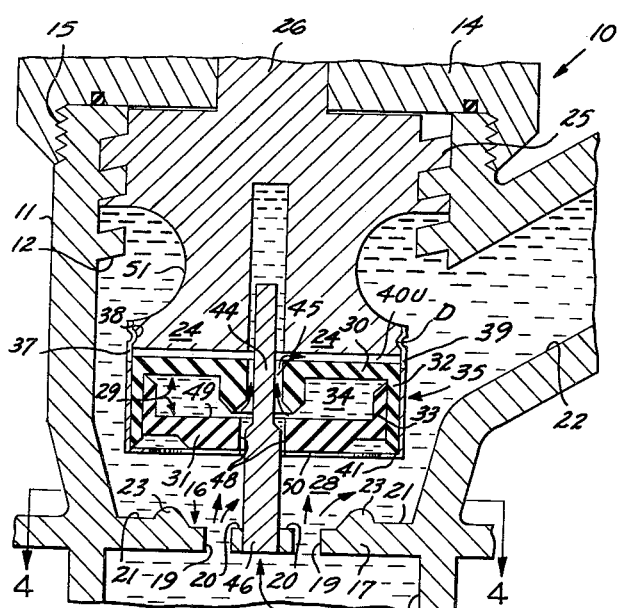
FIG. 3
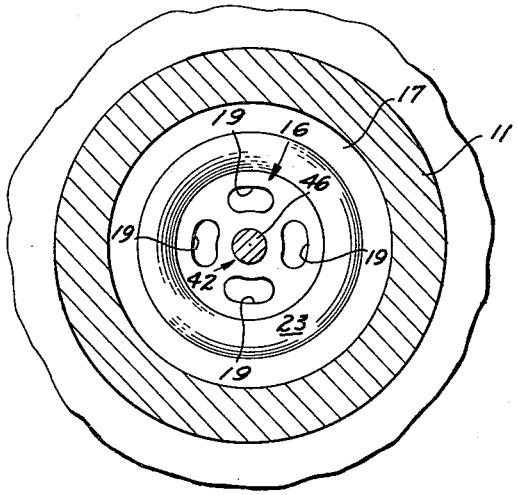
FIG. 4
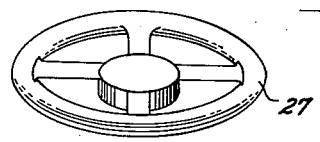
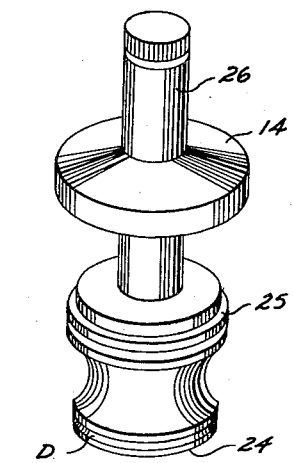
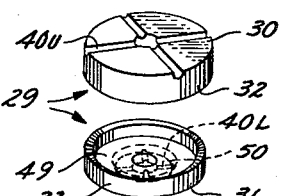
FIG. 5
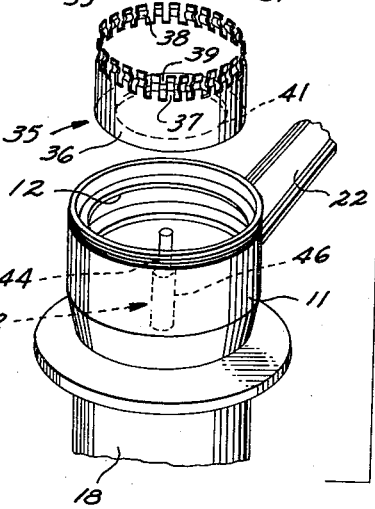
INVENTOR.
J. de la Garza

United States Patent Office 3,043,554
Patented July 10, 1962

3,043,554
NON-DRIP FAUCET VALVE
Jesus de la Garza, 1116 N. Ditman Ave.,
Los Angeles 63, Calif.
Filed June 26, 1961, Ser. No. 119,503
10 Claims. (Cl. 251—175)

The present invention relates generally to the valve art and, more particularly, to a novel non-drip faucet valve primarily adapted for use in a faucet valve housing whereby to control the outflow of water (or other liquid or fluid) from an outlet, nozzle, or spout connected thereto.

The non-drip feature of the novel faucet valve of the present invention is provided by a fluid-pressure-expandable valve means connected between a valve seat means and a valve-actuating member and arranged to be in interior communication with pressurized water (or other liquid or fluid) whereby to automatically expand said valve means in a space defined between said valve-actuating member and said valve seat means and to sealingly engage a sealing portion of said valve seat means in a manner preventing outflow of water (or other liquid or fluid) past the sealingly engaged expandable valve means and the sealing portion of said valve seat means whenever the valve-actuating member is within a predetermined distance of said valve seat means.

The above described arrangement compensates for the customary valve leakage which occurs in conventional hot water faucet valves (or valves for other hot liquids or fluids) because of subsequent contraction of various parts of the valve and actuating means as a result of cooling. Such leakage will not occur in the novel valve of the present invention because the fluid pressure within the expandable valve means will maintain an effective sealing engagement of the valve means with respect to the sealing portion of the valve seat means even after such cooling of the water (or other liquid or fluid), the valve seat means, the valve means, and valve-actuating member occurs in the device of the present invention when used as a hot water faucet valve (or valve for other hot liquids or fluids). However, whenever the valve-actuating member is moved beyond a predetermined distance from the valve seat means, a novel by-pass means effectively communicates the pressurized interior of the expandable valve means with an outlet pipe, nozzle, or spout whereby to allow egress of the pressurized water (or other liquid or fluid) from the interior of said expandable valve means so that the greater inlet pressure of the water (or other liquid or fluid) against the outside of said expandable valve means will effectively collapse said expandable valve means and move it away from the sealing portion of the valve seat means in a manner such as to allow controlled egress of water (or other liquid or fluid) past the collapsed valve and the valve seat into the outlet pipe, nozzle, or spout.

It is an object of the present invention to provide a novel non-drip faucet valve of the type referred to above which will effectively maintain a non-leaking closed relationship of the valve means with respect to the valve seat means irrespective of temperature and/or pressure changes.

It is a further object to provide a novel non-drip valve structure of the character referred to above which includes a fluid-pressure-expandable valve means arranged, whenever the valve-actuating member is in one position, to be fully expanded by interior water, liquid or fluid pressure whereby to seal off the sealing portion of a valve seat means and arranged, whenever the valve-actuating member is in another position, to effectively collapse whereby to unseat itself from the valve seat means to allow the free passage of water or other liquid or fluid.

It is a further object to provide a novel non-drip valve means of the type referred to above which can be used wherever such a non-leaking valve would be advantageous and which is not specifically limited to a faucet valve, although this is one exemplary and highly advantageous application of the improved non-drip valve means of the present invention.

It is an object of the present invention to provide a novel non-drip valve of the character referred to above which is of extremely simple, cheap, foolproof and long-lasting construction such as to be conducive to widespread use thereof.

Further objects are implicit in the detailed description which follows hereinafter, for exemplary purposes and which is not to be construed as specifically limiting the invention. Said implicit objects will be apparent to persons skilled in the art after a careful study of the detailed description which follows hereinafter.

For the purpose of clarifying the nature of the present invention, one exemplary embodiment is illustrated in the hereinbelow-described figures of the accompany two sheets of drawings and is described in detail hereinafter.

Figure 2:
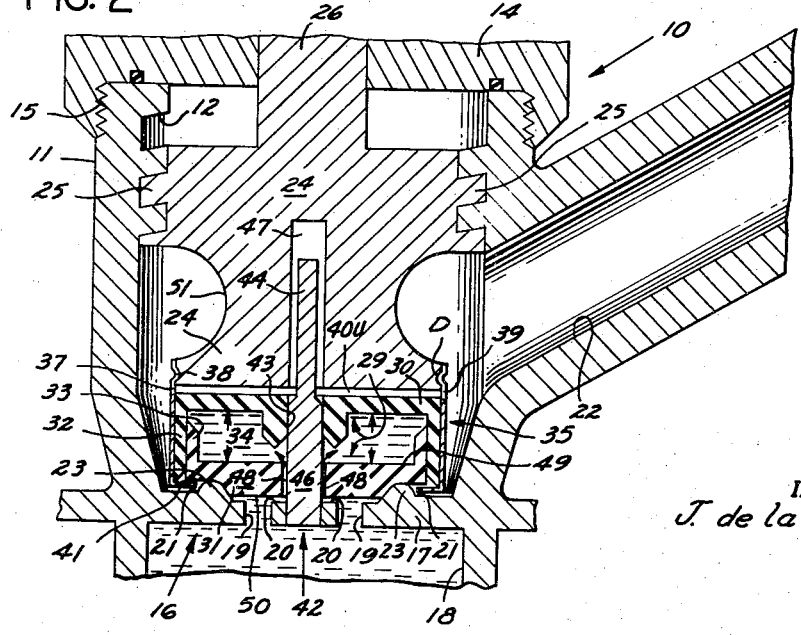
FIG. 2 is an enlarged fragmentary, vertical sectional view taken on the central plane of FIG. 1 and showing the interior details of the valve seat means, the expandable valve means, the valve-actuating member, and the by-pass means, with all of said elements in closed relationship whereby to prevent the passage of water from the inlet conduit or pipe to the outlet conduit, pipe, nozzle, or spout.

FIG. 3 is a fragmentary sectional view similar to FIG. 2 but illustrates the apparatus after the valve-actuating member has been operated in a manner such as to effectively collapse the fluid-pressure-expandable valve means whereby to cause it to be moved by inlet water pressure away from the valve seat means so as to effectively place the entire valve structure in open relationship allowing the passage of water from the inlet conduit or pipe, to the outlet conduit, pipe, nozzle, or spout.

FIG. 4 is a fragmentary sectional view taken in the direction of the arrows 4—4 of FIG. 3.

FIG. 5 is an exploded perspective view illustrating the various elements shown in detail in closed relationship in FIG. 2 and in open relationship in FIG. 3.

Referring to the figures for exemplary purposes, one illustrative embodiment of the invention takes a typical exemplary form wherein it comprises a hollow valve housing means, indicated generally at 10, including a substantially cylindrical upstanding hollow valve housing body portion 11, which is provided with interior thread means 12 and which has an open top 13 adapted to be closed by closure cap means 14. The closure cap means 14 may be threadedly engaged with the exterior of the valve housing body portion or member 11 in the region indicated at 15 or may be otherwise affixed with respect thereto. The cap member 14 of the hollow valve housing 10, in the specific example illustrated, is provided with an upwardly directed exit aperture A, the purpose of which will be described in detail hereinafter.

The lower end of the hollow valve housing means 10 is provided with apertured valve seat means, indicated generally at 16, which consists of a transverse disc-like member 17 carried across the bottom end of the hollow valve housing means 10 and across the upper end of the inlet conduit or pipe means 18 and which is provided with a plurality of inlet aperture means 19 communicating an inflow portion 20 of the valve seat means 16 defined, in the example illustrated, between the hereinafter described valve means grooves 40L and corresponding portions of the valve seat means 16, although not so limited with the pressurized fluid (usually water) in the inlet pipe or conduit means 18.

Said valve seat means 16 is provided with an outflow portion 21 communicable with the outlet pipe or conduit means 22, and is additionally provided with an intervening annular sealing ridge or bead means 23 between said inflow portion 20 and said outflow portion 21.

The hollow valve housing means 10 carries therein the valve-actuating member 24 which is provided with exterior threads 25 threadedly engaged with the interior threads 12 of the hollow valve housing 10 whereby relative rotation of the valve-actuating member 24 by means of the upwardly extending stem portion 26, which sealingly passes through the exit aperture A, and actuating handle means 27 carried at the top thereof, will effectively vertically move said valve-actuating member 24 either toward or away from the valve seat means 16 in spaced opposition with respect thereto, whereby to define therebetween a valve recess, such as that indicated at 28 (best shown in FIG. 3).

The valve recess 28 is provided with fluid-pressure-expandable valve means, indicated generally at 29, having a first or upper portion 30 abuttable with the bottom end of the valve-actuating member 24 and having a second or lower portion 31 abuttable with the valve seat means 16.

The first and second valve portions 30 and 31 are of substantially circular cup-shaped configuration comprising two elastomeric cup-shaped oppositely directed pistons having two oppositely directed circular edge flanges 32 and 33 telescopically engaged with each other whereby to define an interior valve expansion chamber 34 therebetween; said chamber being of variable volume depending upon the vertical spacing of the two valve portions 30 and 31.

Retention or mounting means, indicated generally at 35, is provided for mounting and expandable valve means 29 below the bottom end of the valve-actuating member 24 in the valve recess 28. In the specific example illustrated, said retention or mounting means 35 comprises a cylindrical sleeve 36 provided with a plurality of upwardly directed fingers 37 having inwardly directed retention ends 38 at the tops thereof adapted to be resiliently snapped into engagement with corresponding receiving detent means D carried by the exterior of the valve-actuating member 24. Between the fingers 37 are a plurality of egress slots 39 which communicate the egress groove means 40U with the outlet conduit, pipe, nozzle, or spout 22 for purposes which will be described hereinafter.

The lower end of the cylindrical mounting member 36 is provided with an inwardly directed lip 41 retaining the valve portions 30 and 31 in supported relationship with respect to the valve-actuating member 24.

Figure 1:
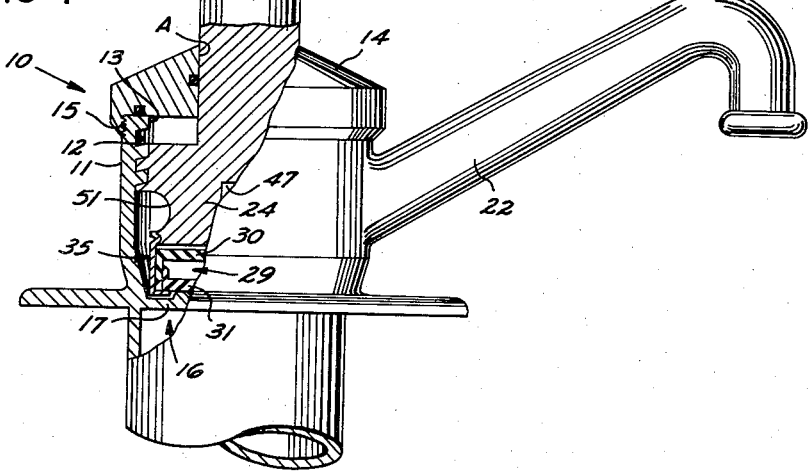
FIG. 1 is a partially broken-away view of one illustrative embodiment of the novel non-drip valve of the present invention wherein it takes the form of a non-drip water faucet valve, although not specifically so limited.

By-pass means, indicated generally at 42, is provided and normally sealingly projects through the first valve portion 30 by way of the sealingly engaged aperture 43 when the entire apparatus is in the closed position shown in FIGS. 1 and 2. However, said by-pass means includes a by-pass portion 44 defining communication passage means 45 with the part of the upper valve portion 30 defining the aperture 43 when the valve-actuating member 24 is moved upwardly into the open position shown in FIG. 3.

In the specific example illustrated, it should be noted that the by-pass means comprises a rod-like member fastened at the bottom to the central portion of the valve seat means 16 and includes the lower larger diameter sealing portion 46 and the upper smaller diameter by-passing portion 44 normally received in a recess 47 in the valve-actuating member 24.

It will readily be understood that normally when the apparatus is in valve-closed position as shown in FIGS. 1 and 2, pressurized inlet water is in communication through the inlet aperture means 19 with the inflow portion 20 of the valve seat means 16 and also is in interior communication with the hollow interior valve expansion chamber 34 through the communication means provided by the space 48 between the inner parts of the lower valve portion 31 and the enlarged portion 46 of the by-pass means 42.

Thus, the pressure within the valve expansion chamber 34 acting against the valve-closing area 49 produces a greater net valve-closing force than does the inlet water pressure acting against the smaller area valve-opening surface 50. This effectively causes the lower valve portion 31 to sealingly engage the sealing ridge means 23 and to maintain the apparatus in closed relationship whenever the valve-actuating member is within a predetermined distance of the valve seat means 16 in the manner illustrated in FIGS. 1 and 2.

However, whenever said valve-actuating member 24 is moved upwardly away from the valve seat means 16 beyond said predetermined distance into a valve-open position such as is shown in FIG. 3, the by-pass aperture 45 allows the interior water pressure within the valve expansion chamber 34 to escape through the aperture 43, egress groove means 40U and slots 39 to the outlet piper or conduit 22 while allowing the greater inlet pressure acting against the bottom surface of all the lower valve portion 31 to effectively collapse the valve means 29 during the flow of water through the inlet aperture means 19, the inflow portion 20, over the now disengaged sealing ridge means 23, through the outflow portion 21 and into the outlet pipe or conduit means 22.

It will be noted that this valve-collapsing action and the effective unseating thereof with respect to the sealing ridge means 23 is facilitated by the lip portion 41 of the retention or mounting means 35.

It should be noted that flow of the water through the apparatus when in the valve-open position shown in FIG. 3 is facilitated by exterior distribution groove means 51 extending around the exterior of the valve actuating member 24. It should also be noted that the partial bottom area 50 of the bottom valve portion 31 is provided with the grooves 40L whereby to effectively define, together with corresponding portions of the valve seat means 16, the inflow portions 20 best shown in FIG. 2. However, it should be understood that both these grooves 40L and the corresponding upper grooves 40U carried by the upper valve portion 30 may, in certain forms of the invention, be carried by the adjacent portions of the valve seat means 16 and the valve-actuating member 24, respectively, or various other such inflow and egress means functionally equivalent thereto may be provided.

It should be noted that the construction of the apparatus is so arranged that progressive upward movement of the valve actuating member 24 effectively increases the size of the through opening between the inlet pipe 18 and the output pipe 22 whereby to correspondingly vary the flow of water (or other liquid or fluid medium) therethrough. However, the invention is not limited to the structure shown, but broadly contemplates a variety of different valve structures embodying the novel non-drip feature of the present invention.

It should be noted that the device of the present invention is particularly well adapted for faucet valves, but is not specifically so limited. Indeed, it may be employed for any valve where the highly advantageous non-drip feature of the present invention is desired. Furthermore, the relative positioning and configuration of inlet and outlet conduit means and the orientation of the various elements of the valve means, valve seat means, and valve-actuating means may be modified substantially within the basic spirit and scope of the present invention. Additionally, the by-pass means may be modified as to configuration and as to mounting. For example, in one form of the invention, it may be carried by the valve-actuating member rather than by the valve seat means and may be arranged to perform substantially the same by-passing function when the apparatus is in valve-open position.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A non-drip valve comprising: a hollow valve housing means having inlet means and outlet means connected thereto and having an interior chamber provided with and controllably movably receiving a controllably movable valve-actuating member; effectively apertured valve seat means positioned in spaced opposition to said valve-actuating member and defining therebetween a valve recess, said valve seat means including an inflow portion in effective communication with said inlet means, an outflow portion for communication with said outlet means, and intervening sealing means between said inflow and outflow portions; fluid-pressure-expandable valve means mounted in said valve recess between said valve-actuating member and said valve seat means and having a first portion abuttable with said valve-actuating member and having a second portion defining with said first portion a hollow interior expansion chamber within the valve means provided with communication means in communication with said effectively apertured valve seat means, said second valve portion being positionable adjacent to said valve seat means and being forcibly sealingly abuttable with said sealing means as a result of interior fluid pressure within said expansion chamber; and by-pass means defining communication passage means positioned for interior communication with said expansion chamber within said valve means when said valve-actuating member is moved away from said valve seat means beyond a predetermined distance, thus allowing the pressurized fluid within the expansion chamber to escape and thus allowing inlet fluid pressure to force said second valve portion toward said first valve portion.

2. A non-drip valve as defined in claim 1 wherein the inner surface of said second valve portion has a greater surface area exposed to interior fluid pressure when said valve means is in closed relationship to said valve seat means than the area on the opposite side thereof exposed to inlet fluid pressure from and adjacent to said effectively apertured valve seat means.

3. A non-drip valve as defined in claim 1 wherein said first and second valve portions are of circular cup-shaped configuration and comprise two elastomeric cup-shaped oppositely directed pistons having two oppositely directed circular edge flanges telescopically engaged with each other whereby to define said interior expansion chamber therebetween.

4. A non-drip valve as defined in claim 1 wherein said by-pass means comprises an egress aperture means in said first valve portion and a rod mounted in said valve recess and extending at least partially thereacross toward said valve-actuating member and through said communication means of said second valve portion and said egress aperture means of said first valve portion; said rod having an enlarged portion adjacent to said valve seat means and having a reduced-size by-pass portion remote therefrom, said enlarged portion sealingly extending through said egress aperture means when said first valve portion is in closed position, and said reduced-size by-pass portion spacedly extending through said egress aperture means when said first valve portion is in open position.

5. A non-drip valve as defined in claim 1 wherein said by-pass means comprises an egress aperture means in said first valve portion and a rod carried by said valve seat means and projecting therefrom across said valve recess toward said valve-actuating member and through said communication means of said second valve portion and said egress aperture means of said first valve portion; said rod having an enlarged portion adjacent to said valve seat means and having a reduced-size by-pass portion remote therefrom, said enlarged portion sealingly extending through said egress aperture means when said first valve portion is in closed position, and said reduced-size by-pass portion spacedly extending through said egress aperture means when said first valve portion is in open position; said communication means comprising an enlarged aperture means in said second valve portion spacedly immediately around said enlarged portion of said rod and adjacent to said effectively apertured valve seat means.

6. A non-drip valve as defined in claim 1 including mounting means for mounting said expandable valve means adjacent to said valve-actuating member in said valve recess for controllable movement therewith.

7. A non-drip valve as defined in claim 1 wherein said valve-actuating member is provided with groove means in communication with said outflow portion of said valve seat means and also in communication with said outlet means.

8. A non-drip valve as defined in claim 1 wherein said valve-actuating member has an extended stem portion provided with an actuating handle means at the remote end thereof exterior of said housing means.

9. A non-drip valve as defined in claim 1 wherein said valve-actuating member has an extended stem portion provided with an actuating handle means at the remote end thereof exterior of said housing means, said hollow valve housing means being provided with an exit aperture means sealingly rotatively engaging said stem portion of said valve actuating member.

10. A non-drip valve as defined in claim 1 wherein said valve-actuating member has an extended stem portion provided with an actuating handle means at the remote end thereof exterior of said housing means, said hollow valve housing means being provided with a threadedly engageable and disengageable closure member extending across said interior chamber and having a centrally positioned exit aperture means sealingly rotatively engaging said stem portion of said valve-actuating member.

References Cited in the file of this patent

UNITED STATES PATENTS

| 763,208 | Robinson | June 21, 1904 |
| 2,042,067 | Leach | May 26, 1936 |
| 2,209,136 | Parker | July 23, 1940 |
| 2,886,283 | Natho | May 12, 1959 |

FOREIGN PATENTS

| 802,047 | France | May 30, 1936 |